United States Patent [19]
Opal et al.

[11] 3,819,992

[45] June 25, 1974

[54] METHOD AND APPARATUS FOR PROVIDING EFFICIENT AND STABLE POWER INVERSION WITH VOLTAGE AND FREQUENCY CONTROL

[75] Inventors: Kenneth E. Opal, Oakmont; Charles R. Kelly, Murrysville; Charles W. Newcamp, Lower Burrell; William M. Ley, Oakmont; Robert S. Pietkiewicz, Glenshaw, all of Pa.

[73] Assignee: Power Control Corporation, Pittsburgh, Pa.

[22] Filed: Jan. 21, 1972

[21] Appl. No.: 219,704

[52] U.S. Cl............. 318/171, 318/230, 318/231, 321/9 A
[51] Int. Cl. ............................................. H02p 7/42
[58] Field of Search................. 318/171, 230, 231; 321/9 A

[56] References Cited
UNITED STATES PATENTS 3,392,316  7/1968  Salihi ............................ 318/231 X
3,512,067  5/1970  Landau .......................... 318/230 X
3,670,224  6/1972  Jensen ........................... 318/231 X Primary Examiner—William M. Shopp, Jr.
Attorney, Agent, or Firm—Brown, Murray, Flick & Peckham

[57] ABSTRACT

Three-phase pulse width modulated inverters are operated to drive an alternating current motor under varying frequency and voltage conditions. The modulated pulse rate is varied to maintain smooth motor control at low frequencies. Provision is made for automatic switching to a current minimization operation after start-up for constant load conditions and automatic switching is provided to change the modulated pulse mode when predetermined voltage limits of the inverters are exceeded.

6 Claims, 17 Drawing Figures

FIG. 3.
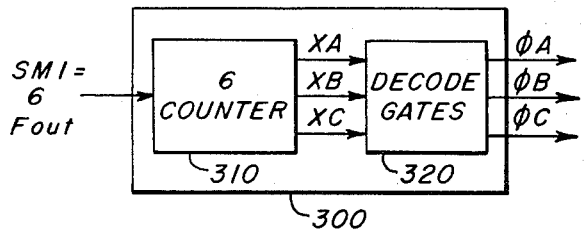
FIG. 3A.
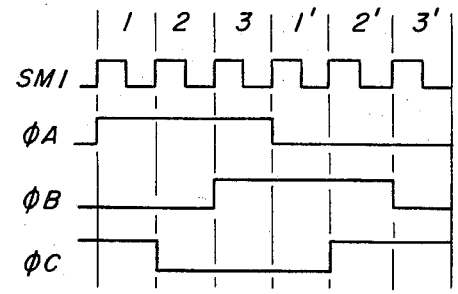
FIG. 3B.
|   | φA | φB | φC |   | XA | XB | XC |
|---|----|----|----|---|----|----|----|
| 1 | 1  | 0  | 1  |   | 0  | 0  | 1  |
| 2 | 1  | 0  | 0  |   | 0  | 1  | 0  |
| 3 | 1  | 1  | 0  |   | 0  | 1  | 1  |
| 1'| 0  | 1  | 0  |   | 1  | 0  | 0  |
| 2'| 0  | 1  | 1  |   | 1  | 0  | 1  |
| 3'| 0  | 0  | 1  |   | 1  | 1  | 0  |
$$\text{DECODE LOGIC} \begin{cases} \phi A = XA' \\ \phi B = XA \cdot XB' + XB \cdot XC \\ \phi C = XB' \cdot XC + XA \cdot XB \end{cases}$$
FIG. 3C.
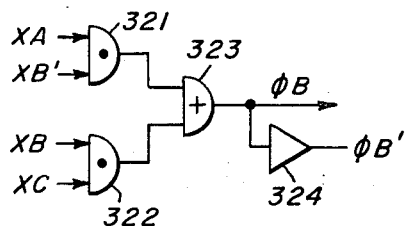
FIG. 3D.
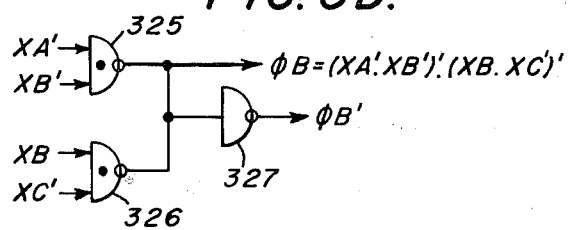
FIG. 4.
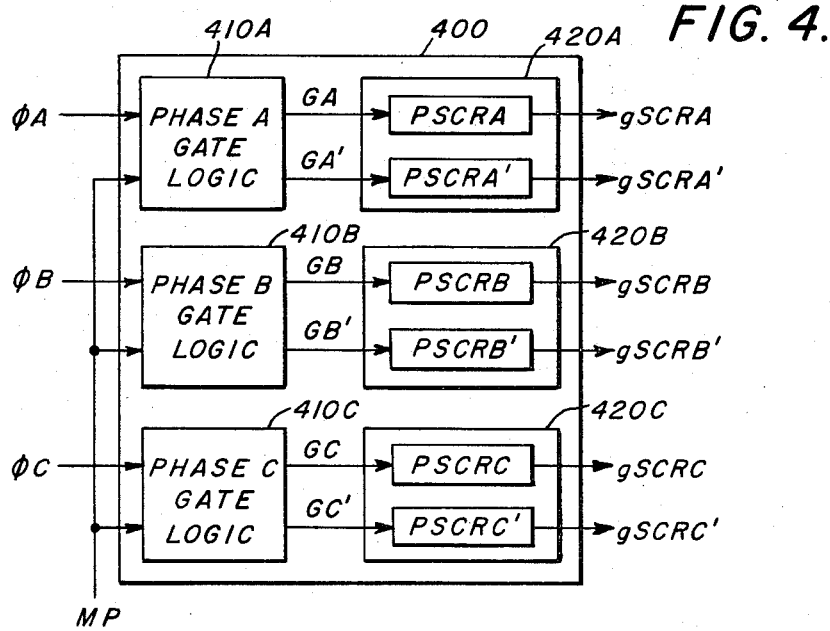

$GA = \phi A \cdot MP$
$GA' = (GA\downarrow)' + \phi A'$
$GB = \phi B \cdot MP$
$GB' = (GB\downarrow)' + \phi B'$
$GC = \phi C \cdot MP$
$GC' = (GC\downarrow)' + \phi C'$

|  | | SLF=0 | | | | SLF=1 | | | |
|---|---|---|---|---|---|---|---|---|---|
| F out < 15 | F3 | 0 | 0 | 0 | 1 | 0 | 0 | 0 | 1 |
| 15 ≤ F out < 30 | F2 | 0 | 0 | 1 | 0 | 0 | 0 | 1 | 0 |
| 30 ≤ F out < 60 | F1 | 0 | 1 | 0 | 0 | 0 | 1 | 0 | 0 |
| F out ≥ 60 | F0 | 1 | 0 | 0 | 0 | 1 | 0 | 0 | 0 |
| | G48 | 0 | 0 | 0 | 1 | 0 | 0 | 0 | 0 |
| | G24 | 0 | 0 | 1 | 0 | 0 | 0 | 0 | 1 |
| | G12 | 0 | 1 | 0 | 0 | 0 | 0 | 1 | 0 |
| | G6 | 1 | 0 | 0 | 0 | 1 | 1 | 0 | 0 |

$G48 = F3 \cdot SLF'$
$G24 = F2 \cdot SLF' + F3 \cdot SLF$
$G12 = F1 \cdot SLF' + F2 \cdot SLF$
$G6 = F0 + F1 \cdot SLF$
$GP = G6 \,(6\, Fout) + G12\,(12\, Fout) + G24\,(24\, Fout) + G48\,(48\, Fout)$ $IMLF = (MP \cdot VLUI')' \cdot (MP' \cdot ULLI')'$ 3,819,992

METHOD AND APPARATUS FOR PROVIDING EFFICIENT AND STABLE POWER INVERSION WITH VOLTAGE AND FREQUENCY CONTROL

CROSS-REFERENCES TO RELATED APPLICATIONS

1. Application Ser. No. 219,703, filed Jan. 21, 1972 and entitled "Method and Apparatus for Motor Current Minimization" now U.S. Pat. No. 3,723,840, issued Mar. 27, 1973;
2. Application Ser. No. 219,733, filed Jan. 21, 1972 and entitled "Method and Apparatus for Pulse Width Modulation with Variable Frequency Modes", now U.S. Pat. No. 3,766,497, issued Oct. 16, 1973; and
3. Application Ser. No. 219,732, filed Jan. 21, 1972 and entitled "Method and Apparatus for Center Referenced Pulse Width Modulation", now U.S. Pat. No. 3,753,155, issued Aug. 14, 1973.

BACKGROUND OF THE INVENTION

It has been found that the most reliable and precise speed control for a motor may be obtained through the use of pulse width modulated inverters providing power for a three phase alternating current motor such as an induction, synduction or synchronous motor. To properly operate such a motor, certain voltage-to-frequency relationships must be observed during start-up to prevent the overloading or overdriving of the motor, but once this has been accomplished, switching to a current minimization mode as is more specifically described Reference (1) above becomes appropriate. To obtain a smooth pulse width modulation control, the maximum number of pulses to be modulated should be generated for each period of the desired output speed or frequency with the limit being the commutation rate of the inverters. Thus, it becomes desirable to incorporate some method of varying the number of pulses to be modulated after each period of the output frequency as the frequency range decreases.

However, it also becomes necessary to protect the system from a condition where the modulation pulse rate, sometimes referred to as the pulse width modulation carrier, considered together with the output voltage required for the control reaches the switching limit for the inverters. This may occur at either of two voltage extremes. If the voltage called for reaches the upper limit, then the pulse width becomes so great that the switching time which remains at the end of a pulse modulation period and the beginning of the next period is at the switching limit of the inverter. It is assumed herein that this limit is in the order of 300 microseconds utilizing a presently available circuit.

As is more fully discussed in Reference (3) above, it is desirable to modulate about a center reference for each modulation pulse in order to gain better control over the harmonic content of the output signals. This makes it possible to approach a sinusoidal output current more closely possible than previously available in the prior art.

In order to incorporate the features of current minimization, variable frequency mode, and center-referenced pulse width modulation, it becomes necessary to provide a system which may incorporate all of these features with a reasonable amount of hardware.

SUMMARY OF THE INVENTION

The invention combines features of automatic current minimization during various load conditions, variable frequency mode control, and center-referenced pulse width modulation, wherein three-phase control signals required for thyristor gate control are developed as a function of the lowest multiple pulse rate in the variable mode system. Provision is also made in the system for terminating current minimization control during input frequency set-point changes, to permit the system to ramp the frequency reference to the next setting at a predetermined rate which may vary from as fast as a half a second to about 30 or 40 seconds. Current minimization is automatically terminated until the new frequency set-point is reached and then, under the optional control of the user, may be employed to select that voltage operating point providing minimum motor current.

The three-phase logic control provided by the invention automatically adjusts the phase relationships for varying numbers of modulated pulses per cycle while utilizing the lowest submultiple rate reference (SM1) as the input to the three-phase control. The three-phase output signals, referred to herein as $\phi A$, $\phi B$ and $\phi C$, are then translated in a three-phase control having six control periods, each of which exists for 60 electrical degrees. These periods are referenced as follows:

1.   0°–60°
2.   60°–120°
3.   120°–180°
1'.  180°–240°
2'.  240°–300°
3'.  300°–0°

A thyristor gate control is provided which responds to signals $\phi A$, $\phi B$ and $\phi C$ and translates these signals into six thyristor gating signals for providing the proper control for each of the six phases mentioned above.

Continuous tests are performed upon the minimum and maximum pulse widths to prevent either an absolute lower limit or an absolute upper limit from being exceeded. If either limit is approached, the invention provides an automatic decrease in the multiple of the modulation pulse rate. Basically, the method of the system herein is to utilize the frequency range control technique of copending application Reference (2) and provide two modes of operation: first, where no voltage limit upper or lower has been exceeded and the pulse rate then corresponds to that described in Reference (2); and a second mode, which may be referred to as the overlimit mode, during which the pulse rate is cut in half to correspond to the next lower pulse rate. If the voltage limit is exceeded when the pulse rate is at the minimum, no reduction in pulse rate is made and the system then prevents any further voltage change from causing the inverters to malfunction.

The above and other objects and features of the invention will become apparent from the following detailed description taken in connection with the accompanying drawings which form a part of this specification, and in which.

Figure 1:
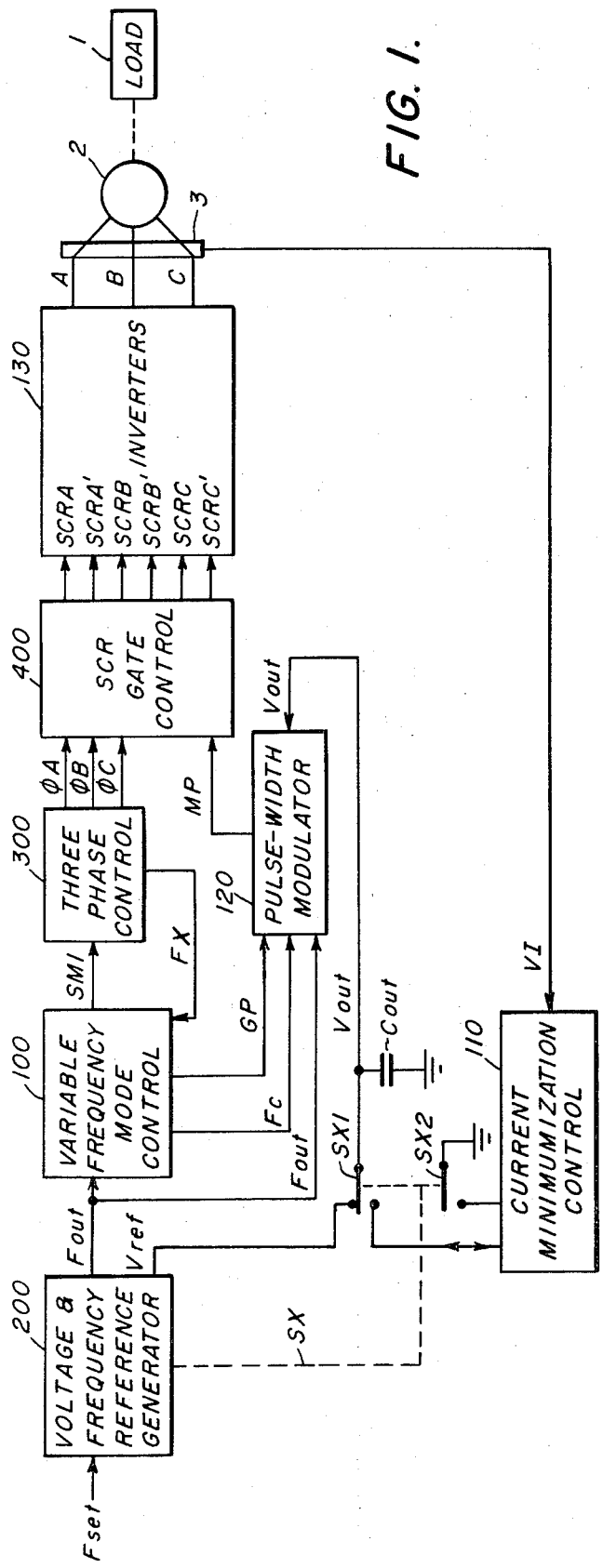
FIG. 1 is a block diagram of a system constructed according to the invention.
Figure 2:
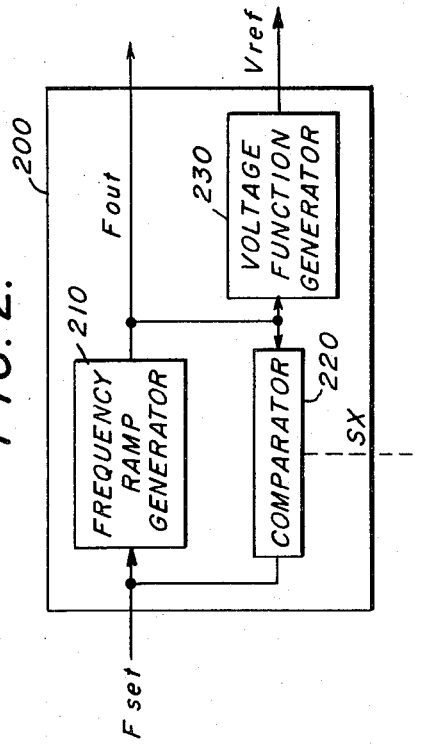
FIG. 2 is a block diagram of an arrangement for performing the function of means 200 of FIG. 1.
Figure 2A:
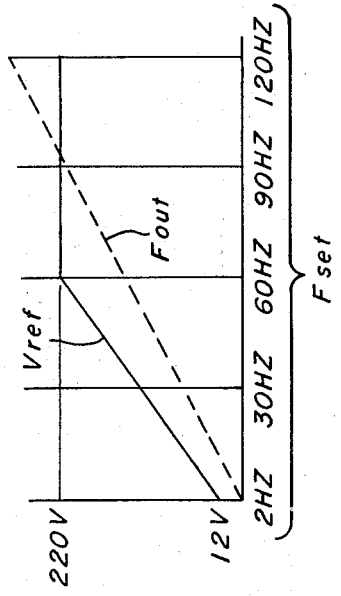
Figure 4A:
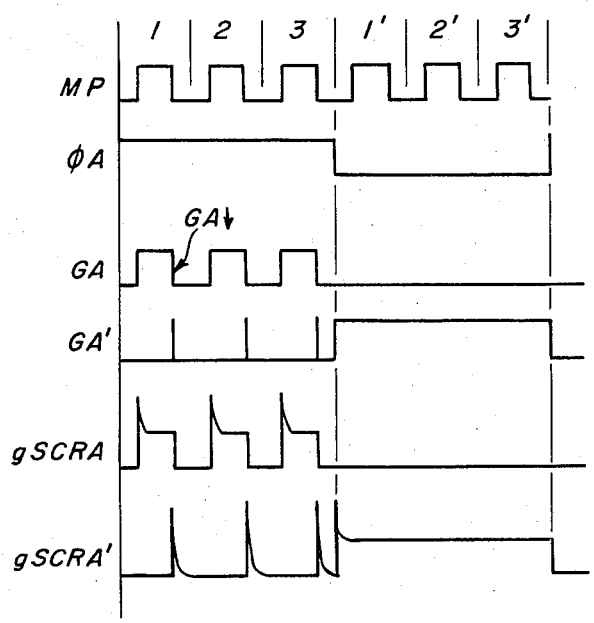
Figure 4B:
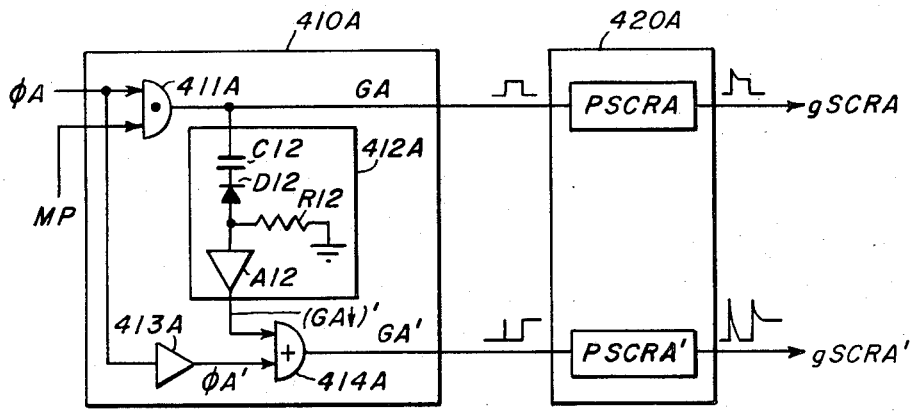
Figure 4C:
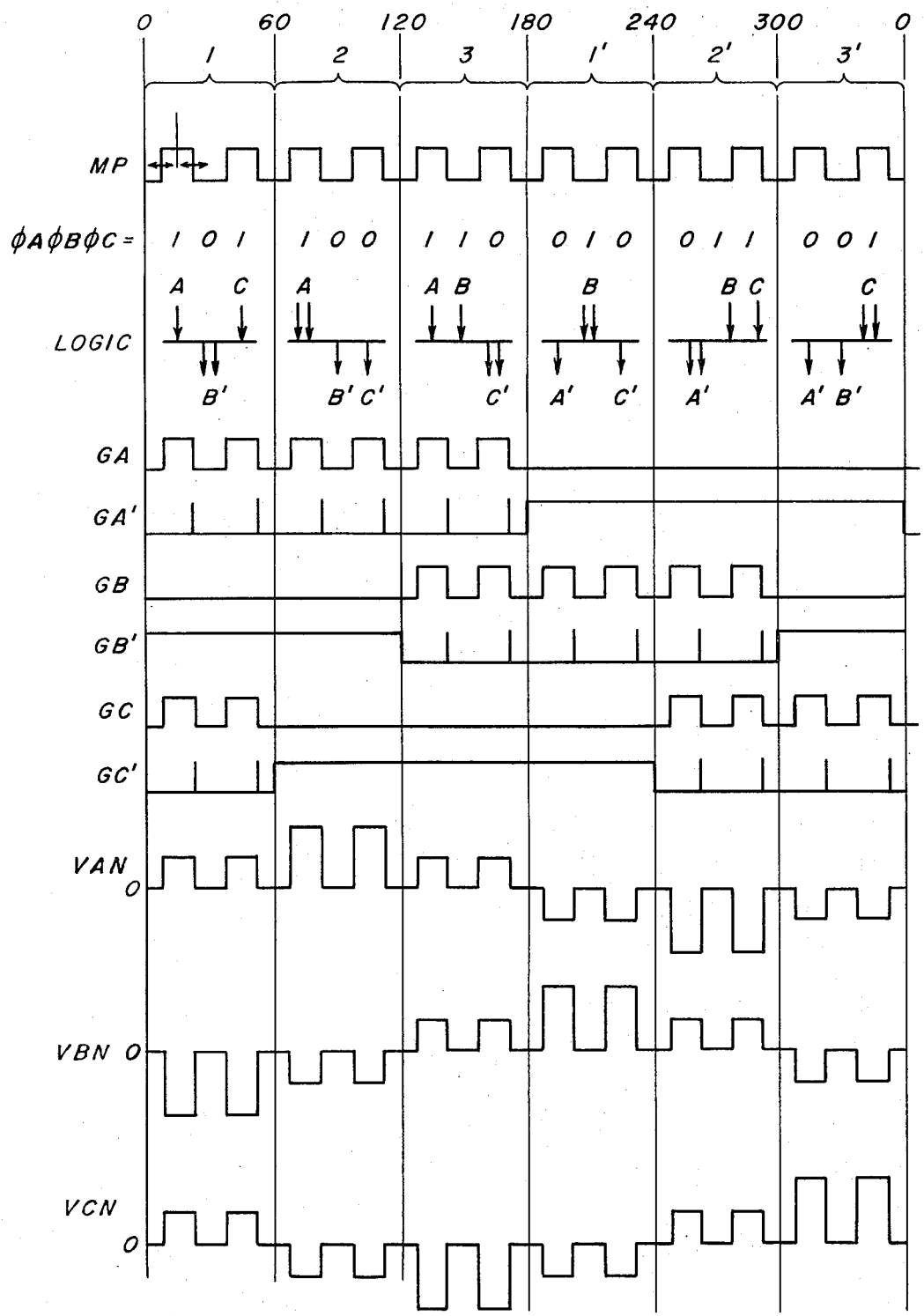
Figures 5, 6:
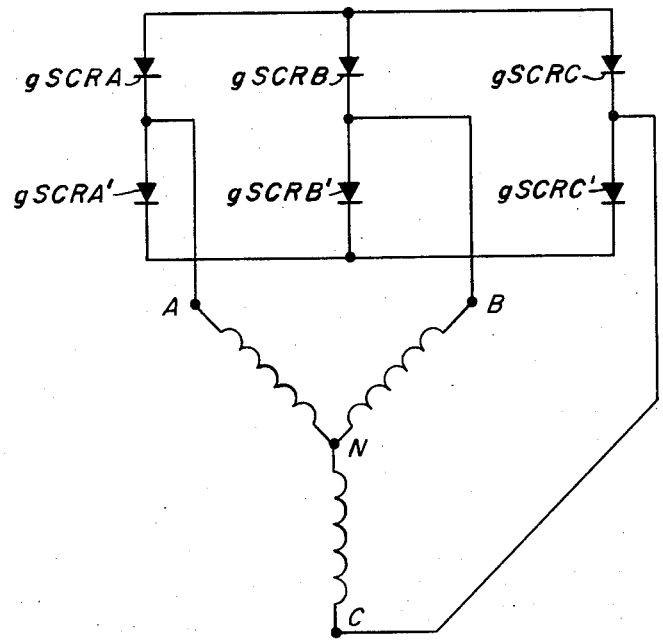
Figure 7:
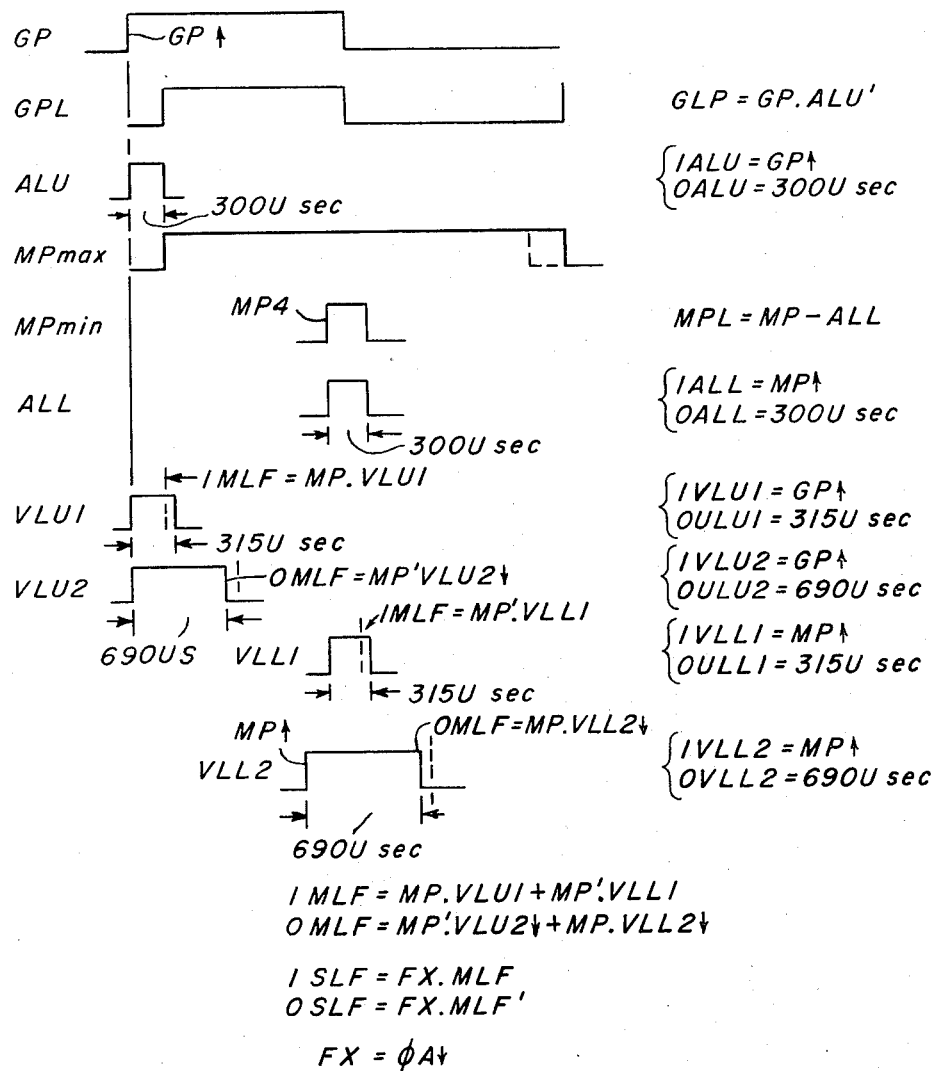
Figure 8:
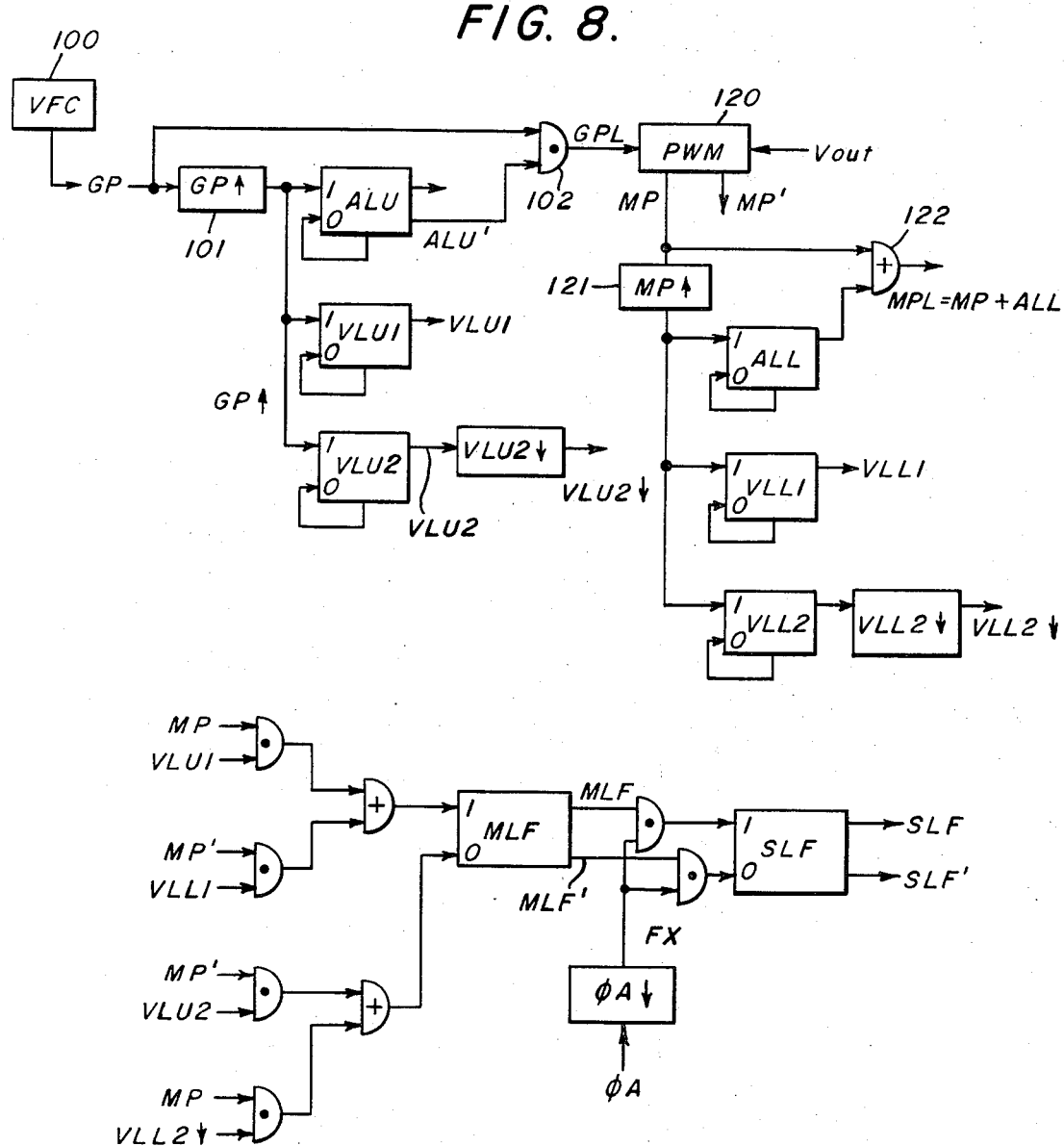
Figure 8A:
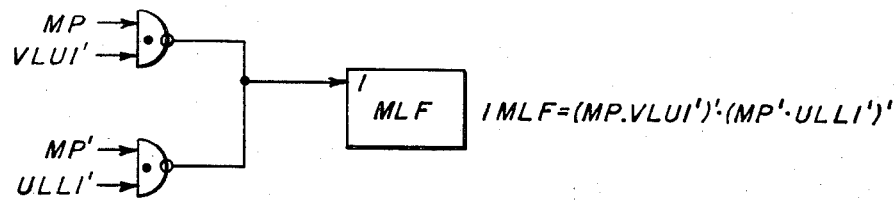

FIG. 2A contains a set of curves relating a voltage reference (Vref) to a frequency referecne (Fout);

FIG. 3 is a block diagram of the three-phase control of FIG. 1;

FIG. 3A shows a set of waveforms relating the three-phase output signals to the various periods of operation described above;

FIG. 3B is a logic chart summarizing the states of the various signals in means 300 as they are related to the periods of operation, with a summary of the logic for accomplishing such operation;

FIG. 3C is a schematic diagram of logic suitable for translating the codes of FIG. 3B into appropriate output signals;

FIG. 3D illustrates an alternate set of logic for accomplishing three-phase signal translation;

FIG. 4 is a block diagram of gate control means 400 of FIG. 1;

FIG. 4A is a composite set of waveforms illustrating the operation of control 400;

FIG. 4B is a schematic diagram of a circuit suitable for utilization as a logic gate in means 400;

FIG. 4C is a composite set of waveforms illustrating the manner in which three-phase pulse width modulation is controlled according to the method of the invention;

FIG. 5 is a schematic diagram illustrating the manner in which the output thyristors of the inverters are connected to the windings of motor;

FIG. 6 is a logic chart summarizing the switching function which must be performed to reduce modulation pulse rate to prevent exceeding voltage limits;

FIG. 7 shows various upper and lower limit signals which are developed according to the method of the invention with appropriate logic for carrying out the method of control;

FIG. 8 is a schematic logic diagram of apparatus suitable for practicing the limit protection method of the invention; and FIG. 8A is a variation of the logic diagram of FIG. 8.

Referring now to FIG. 1, it will be noted that a representation of frequency or motor speed (Fset) is applied to a voltage and frequency reference generator 200 which produces output signals corresponding to frequency (Fout) and voltage (Vout). When the frequency signal Fout reaches the desired speed or frequency setting Fset, a switching signal SX produced by a comparator 220 in FIG. 2 is operative to transfer the contacts SX1 and SX2 shown in FIG. 1. It is this transfer that automatically enables a current minimization control 110. A specific arrangement of control 110, suitable for the practice of the present invention, is described in Reference (1) above.

An initial voltage reference Vout is established at the output of switch SX1 across capacitor CVout and this voltage reference is changed during current minimization control to make it possible to obtain the desired torque to drive a load 1 with a minimum current as measured through current sensor 3.

The output frequency reference Fout is applied to a variable frequency mode control 100 which may be of the type specifically described in Reference (2) above. Control 100 produces a series of gating pulses GP at a rate corresponding to the frequency range which is sampled. The frequency range which is in operation at any time is represented by a frequency control code FC and the frequency reference Fout are all applied to a pulse width modulator 120 which also receives signal Vout. Modulator 120 preferably is of the center-referenced type specifically described in Reference (3) above and produces a modulated output pulse MP which is applied to thyristor or SCR gate control 400 which also receives the three-phase output signals previously mentioned. Control 300 receives one of the sub-multiple pulse rate signals (SM1) which may also correspond to pulse signals GP when the lowest possible pulse rate is being employed. Control 400 develops six gate control signals which are applied to a set of six corresponding output thyristors in inverters 130 with thyristors SCRA and SCRA' being gated under the control of signals $\phi$A and MP, thyristors SCRB and SCRB' being gated under the control of signals $\phi$B and MP thyristors SCRC and SCRC' being gated under the control of signals $\phi$C and MP.

In referring to FIG. 2A, it will be noted that the system start-up may typically begin at a speed or frequency reference Fset of 2 Hertz with the voltage being given an initial boost of typically 12 volts. To illustrate a typical start-up operation, it will be assumed that the frequency setting initially is 60 Hz and that frequency ramp generator 210 of FIG. 2 is operated to produce an output signal Fout which increases from 2 Hz to 60 Hz. Signal Fout is applied to a voltage ramp function generator 230 which produces signal Vref. In a typical application voltage function generator 230 is shown on page 16 of *Handbook of Operational Amplifier Applications* 1963, Burr Brown Research Corp., Tucson, Arizona and produces a signal initially representing 12 volts at 2 Hz and rises to 220 volts when Fout reaches 60 Hz. At this time, comparator 220 operates switch SX and the system then enters current minimization control. During current minimization the voltage Vout across capacitor CVout may change substantially from the 220 volt reference. When the operator desires to change the set frequency (Fset), switch SX returns to its original state. As soon as Fout again reaches the desired set-point (Fset), switch SX is again actuated and current minimization can then begin again. It will be understood that, while current minimization in the system of the invention is preferred, cases may arise where the load variation occurs too rapidly for the minimization control to be effective. Furthermore, it will be appreciated that current minimization can be inhibited manually when necessary.

In order to illustrate a specific system arrangement, it will be assumed that sub-multiple pulse rate series SM1 is equal to six times Fout (6Fout) so that six pulses are generated in SM1 for each period of Fout. Pulse series SM1 is applied to a six counter 310 shown in FIG. 3 which provides conventional binary coded output signals XA, XB and XC. These are translated through decode gates 320 to the three-phase control signals $\phi$A, $\phi$B and $\phi$C. In FIG. 3A, the phase relationship between the signals mentioned is shown and it will be ntoed that six operating periods are defined as previously noted. A summary of all of the signal conditions is found in FIG. 3B and, from this figure, appropriate logic for generating signals $\phi$A, $\phi$B and $\phi$C may be derived. It will be understood that, while it is preferred to use a conventional six-count binary counter, other counters may be utilized to provide the decoding directly. The important function of means 300 is simply to provide the three-phase control signals defining the six periods of operation as previously noted.

In FIGS. 3C and 3D, gating arrangements are shown for developing signals $\phi B$ and $\phi B'$. In FIG. 3C, the AND function of signals XA and XB' is developed in an AND circuit 321 and the AND function of signals XB and XC as developed through AND circuit 322. The outputs of circuits 321 and 322 are combined in an OR circuit 323 providing signal $\phi B$. Signal $\phi B$ is then inverted through an amplifier or gate 324 producing signal $\phi B'$. In FIG. 3D, NAND gates 325 and 326 are employed to develop signal $\phi B$ which is applied then to an inverting NAND gate 327 producing signal $\phi B'$. Many variations in logic for developing signals $\phi A$, $\phi B$ and $\phi C$ will be apparent to those skilled in the art.

In FIG. 4, the general form of means 400 is shown for translating the phase control signals and the modulated pulse signal MP into the proper thyristor gating signals previously defined. The waveforms which are produced by the operation of phase A gate logic 410A and pulse amplifiers 420A (producing gating signals gSCRA and gSCRA') are shown in FIG. 4A. Here it will be noted that signal $\phi A$ is ON during periods 1–3 and is OFF during the complementary periods 1'–3'. Gating signal GA is produced as the AND function of $\phi A$ and MP with the logic being shown in FIG. 4B. Gating signal GA' contains sharp pulses during periods 1–3 corresponding to the trailing edge of signal GA. This trailing edge is referenced as GA↓ in the logic of FIG. 4B and is inverted to produce the pulses which are represented as (GA↓)'. During periods 1'–3', when signal $\phi A$ is OFF, gate signal GA is OFF, and gate signal GA' is ON. Thus, the logic for GA' is:

$$GA' = (GA\downarrow)' + \phi A'$$

Pulse amplifiers 420 are conventional circuits which translate their respective inputs into corresponding pulses with the leading edge sharply amplified. Thus, gate pulses gSCRA are similar to gating signals GA except for the accentuation of the leading spike. A similar translation is made in pulse amplifier PSCRA' in 420A which translates gate signal GA' into the corresponding thyristor gating pulses gSCRA'.

A suitable circuit for accomplishing the desired gating is shown in FIG. 4B where circuit 410A is illustrated. Signals $\phi A$ and MP are applied to an AND circuit 411A which produces output signal GA. Signal $\phi A$ is inverted in an amplifier 413A to produce signal $\phi A'$ which is applied to an OR circuit 414A which also receives the output signal of inverting differentiating circuit 412A. Circuit 412A has an input capacitor C12 which receives signal GA and a diode D12 coupled to a resistor R12 for producing a negative spike when input signal GA changes from ON to OFF. This spike is inverted in amplifer A12 and becomes the signal logically represented as (GA↓)'. The logic for circuit 410A is summarized in FIG. 4B as well as that appropriate for the other gating logic. The three-phase gating operation of the invention is summarized in FIG. 4C where, as an illustration, it is assumed that a multiple of 12 is utilized for frequency control, so that 12 modulated pulses MP are shown as occurring within the 360° period of the output frequency. During each of the 60° periods, a representation of the code for signals $\phi A$, $\phi B$ and $\phi C$ is shown so that it will be noted, for example, that period 1 (0° to 60°) has a code 101 and period 2 (60°–120°) has a code 100. Corresponding to each phase code representation, there is a representation of the resulting current into the motor windings shown in FIG. 5. Taking period 1, for example, it will be noted that current enters into windings A and C, passes through the node N and then through winding B. The voltage pulse across winding B is thus two-thirds that of A and C and is negative. The reference B' is utilized to indicate the fact that phase B is OFF (O) and that the voltage from point B to the node N is negative. Thus, if the phase control code developed by control 300 is examined, it will be noted to directly define the output waveforms VAN, VBN and VCN. The wave shapes for the various gating signals may also be directly defined in terms of the logical interrelationship between modulated pulses MP and the associated phase control signals.

Before considering the specific method by which the invention prevents voltage variations from disabling the inverter, a specific frequency mode of operation will be discussed, as is more fully set forth in copending application Reference (2) above. Reference for the purpose of this discussion is made to FIG. 6 where a logical summary of the operating conditons is set forth. It is assumed first that, when there is no voltage overload condition a limit flip-flop referenced as SLF is OFF. Thus, in FIG. 6, all of the representations under SLF = 0 correspond to the state of the system with no voltage overload.

When signal SLF is OFF, pulse series GP may be defined as follows:

$$GP = FO \cdot (6\ Fout) + F1 \cdot (12 Fout) + F2 \cdot (24 Fout) + F3 \cdot (48 Fout).$$

In FIG. 6, the definition of gates G6, G12, G24 and G48 is such that when voltage overload flip-flop SLF is OFF, the 6, 12, 24 and 48 pulse gates become respectively equal to FO, F1, F2 and F3. Thus, in the case where FO is ON and F1-F3 are OFF, gate G6 is ON and gates G12–G48 are OFF.

When SLF is ON, gate G48 becomes OFF for all conditions and gate G24 takes over the gating function where control signal F3 is ON. Thus, instead of 48 pulses being generated per period of the output frequency, the number is reduced to 24 as soon as the commutation limit condition is detected. In a similar manner, the twenty-four pulse gating function during the time control signal F2 is ON is terminated if flip-flop SLF goes ON and the number of pulses generated is reduced to twelve so that gate G12 includes the gating function F2·SLF. In the case of gating function G6, it is assumed that six pulses per period are the minimum number to be generated so that when the voltage overload flip-flop SLF goes ON, six pulses will be continued to be generated if control flip-flop F1 is ON. The logic for gates G6, G12, and G48 is summarized in FIG. 6. Suitable logic circuits for accomplishing this function will be apparent to those skilled in the art.

IN FIG. 7, the waveforms and logic relating to the method of the present invention for limiting voltage and for detecting possible voltage overload conditions are summarized. All of the signals are related to one period of the gating pulse series GP, the leading edge of which is referenced as GP↑. The maximum pulse width is shown as MPmax and the minimum as MPmin. An absolute limit one-shot multivibrator ALU is turned ON by GP↑ and remains ON for 300 microseconds which is the minimum gating period required for the commutator of the type described in pervious art. Thus, a limited gate pulse for use in the pulse width modulator, which may be of the type described in Reference (3) above, is defined as $GPL = GP\uparrow \cdot ALU'$ which effectively reserves the first 300 microseconds of each gating pulse period for the minimum switching time of the commutated inverter.

The minimum modulated pulse period (MPmin) is controlled through the use of an absolute lower limit one-shot multivibrator ALL which is turned ON by the leading edge of modulated pulse MP referenced as MP $\uparrow$. The one-shot return time constant is again made 300 microseconds to insure that the commutation gating will not be switched for a minimum of 300 microseconds. This, then, permits the definition of a limited modulated pulse output MPL which replaces signal MP applied to gate control 400 of FIG. 1 in systems utilizing the voltage overload limiting concept of the invention. MPL may be defined as:

$$MPL = MP + ALL,$$

signifying that if modulated pulse MP were to turn OFF before the end of the 300 microseconds, the ON state of MPL is sustained by the ON state of signal ALL.

Two voltage limit one-shot multivibrators VLU1 and VLU2 are employed to detect the possibility of the maximum pulse width MP approaching the absolute limit. Multivibrator VLU1 is turned ON by GP$\uparrow$ and has a time constant of 315 microseconds. If signal MP turns ON before VLU1 is OFF, a master limit flip-flop MLF is turned ON by the logic $1MLF = MP \cdot VLU1$. The master limit flip-flop MLF is copied into flip-flop SLF, which may be considered to be a slave flip-flop, each time signal $\phi A$ goes OFF as represented by $\phi A\downarrow$ so that FX is defined as $FX = \phi A\downarrow$, and this also becomes the reference frequency signal utilized in Reference (2) above to copy the frequency sample code CC into a frequency control flip-flop FC. As soon as flip-flop SLF is turned ON, it will be recalled that the pulse frequency is reduced unless it is already at the minimum of 6·Fout. After this has occurred, a voltage upper limit test is performed with one-shot multivibrator VLU2 which is turned ON by GP$\uparrow$, but has a time constant of 690 microseconds, which is more than double that of the time constant of VLU1. The purpose of one-shot VLU2 is to test whether flip-flop MLF may be turned OFF in order to return to the normal operation at the maximum pulse rate. In terms of logic, this test determines whether modulated pulse MP is still OFF at the time signal VLU2 goes OFF as represented by VLU2$\downarrow$. Thus, the OFF function for flip-flop MLF may be defined as $OMLF = MP' \cdot VLU2\downarrow$.

A lower limit test is made with a one-shot multivibrator VLL1 which is turned ON by MP$\uparrow$ and remains ON for 315 microseconds. If MP turns OFF before the end of the 315 microseconds, flip-flop MLF is turned ON indicating a violation of the lower voltage limit by the logic $1MLF = MP' \cdot VLL1$. Thus, the total ON-turning logic for flip-flop MLF summarized in FIG. 7 is $1MLF = MP \cdot VLU1 + MP' \cdot VLL1$. After flip-flop MLF is ON, signal VLL2, having a time constant of 690 microseconds, is compared to MP and if MP is still ON at the time VLL2 goes OFF, MPF is turned OFF by the function $OMLF = MP \cdot VLL2\downarrow$.

The absolute limit control and the limit testing logic summarized in FIG. 7 is shown in a typical mechanization with logic in FIG. 8. A few examples of the actual mechanization will be considered, it being assumed that translation of the logic into appropriate operating means will be apparent to those skilled in the art. Signals GP and MP produced by variable frequency control 100 and pulse width modulator 120 are translated into positive differentiated pulses GP$\uparrow$ and MP$\uparrow$ by circuits 101 and 121. These may be differentiating circuits of the general type shown in 412A of FIG. 4B. Signal GP$\uparrow$ then turns ON one-shot multivibrators ALU, VLU1, and VLU2; whereas signal MP$\uparrow$ turns ON one-shot multivibrators ALL, VLL1 and VLL2. Signal MPL is developed through an OR circuit 122 according to the logic previously defined, and an AND cicuit 102 combines signals ALU' and GP to develop GPL which is used in pulse width modulator 120. The remainder of the logic should be apparent from this example.

As an example of an obvious variation in logic which will be apparent to those skilled in the art, FIG. 8A shows the use of two NAND circuits to develop the one-set signal for flip-flop MLF. This logic may be defined as $1MLF = (MP \cdot VLU1')' \cdot (MP' \cdot VLL1')'$. If this logic is expanded it will be found to be the equivalent of $1MLF = MP \cdot VLU1 + MP' \cdot VLL1$ as is mechanized in FIG. 8.

From the foregoing description, it should now be apparent that the present invention provides a system combining features of current mimimization., variable frequency mode control, and center-referenced pulse width modulation in a threephase control system where voltage limit protection may be provided to insure proper operation of the system.

I claim as my invention:

1. A power control system comprising first means for translating a motor speed input reference into a ramp frequency output signal and a voltage reference, said first means including means for generating a switch signal when the ramped frequency reference corresponds to the motor speed reference; second means responsive to the switching signal and to a representation of motor current for varying the inital voltage reference to minimize the motor current; third means responsive to a representation of desired output frequency produced by said first means for producing variable frequency mode control signal and a gating pulse series; fourth means for modulating the gating pulse series appropriate to the frequency mode control of said third means for producing modulated pulses; and fifth means coupled to said third and fourth means for producing three-phase modulated pulse signals for the motor.

2. The motor control system of claim 1 wherein said fifth means includes logic circuits for limiting the minimum and maximum pulse widths of the modulated pulse series.

3. The motor control system of claim 1 wherein said fifth means includes logic circuits for detecting a possible voltage overload condition and responds to this detection by reducing the pulse rate of the modulated pulses accordingly.

4. A method of three-phase motor control comprising generating variable pulse rate series of gating pulses corresponding to different output frequencies, respectively; translating the lowest pulse rate into three-phase control signals; producing six-phase inverter gate signals in response to the three-phase control signal and to the variable pulse rate modulated pulses having widths corresponding to voltage output; and limiting the minimum and maximum widths of the modulated pulses to insure proper commutated inversion to produce motor drive signals.

5. The method defined in claim 4 wherein the voltage output reference is produced by current minimization control sensitive to measured motor current.

6. The method defined in claim 4 wherein pulse width modulation is referenced to the effective center of the pulse rate variable gating pulses.

* * * * *